US008890479B2

(12) United States Patent
Toh

(10) Patent No.: US 8,890,479 B2
(45) Date of Patent: Nov. 18, 2014

(54) HOLDING PLATFORM FOR MOBILE INFORMATION TERMINALS, DESKTOP TELEPHONE, AND FIXING METHOD CONNECTOR FOR MOBILE INFORMATION TERMINALS

(71) Applicant: NEC Infrontia Corporation, Kawasaki (JP)

(72) Inventor: Tadamine Toh, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 14/350,752

(22) PCT Filed: Oct. 4, 2012

(86) PCT No.: PCT/JP2012/076374
§ 371 (c)(1),
(2), (4) Date: Apr. 9, 2014

(87) PCT Pub. No.: WO2013/061797
PCT Pub. Date: May 2, 2013

(65) Prior Publication Data
US 2014/0247012 A1    Sep. 4, 2014

(30) Foreign Application Priority Data
Oct. 24, 2011    (JP) .................................. 2011-232523

(51) Int. Cl.
*H02J 7/00*    (2006.01)
(52) U.S. Cl.
CPC ............. *H02J 7/0044* (2013.01); *H02J 7/0045* (2013.01); *H02J 7/0042* (2013.01)
USPC ......................................... 320/115; 320/107
(58) Field of Classification Search
USPC ................................................. 320/107, 115
See application file for complete search history.

(56) References Cited

U.S. PATENT DOCUMENTS

| 6,084,963 A | 7/2000 | Hirai et al. |
| 8,482,252 B2 * | 7/2013 | Byrne ........................... 320/115 |
| 2014/0191707 A1 * | 7/2014 | Carreon et al. ............... 320/107 |

FOREIGN PATENT DOCUMENTS

| JP | 10-200611 A | 7/1998 |
| JP | 11-354207 A | 12/1999 |

(Continued)

*Primary Examiner* — Richard V Muralidar
(74) *Attorney, Agent, or Firm* — Sughrue Mion, PLLC

(57) ABSTRACT

Provided is a portable information terminal holding base, including: a holding base main body having a main mounting surface inclined with respect to a horizontal surface, the holding base main body being configured to hold, on the main mounting surface, one of a plurality of types of portable information terminals including a first portable information terminal and a second portable information terminal that is different from the first portable information terminal in length and width size and position of a battery-charging slot; and a battery-charging cover removably mounted to the holding base main body, the battery-charging cover being configured to house a plurality of types of battery-charging plug connectors, which are formed compatible with battery-charging slots of the plurality of types of portable information terminals, respectively, the battery-charging cover being configured to: house, at a first fixing position, a battery-charging plug connector, which is formed compatible with specifications of a battery-charging slot of the first portable information terminal; and fix, when the second portable information terminal is to be held on the holding base main body, at a second fixing position different from the first fixing position in accordance with the length and width size of the second portable information terminal and the position of the battery-charging slot of the second portable information terminal, a battery-charging plug connector, which is formed compatible with the battery-charging slot of the second portable information terminal.

8 Claims, 11 Drawing Sheets

(56) References Cited

FOREIGN PATENT DOCUMENTS

| | | |
|---|---|---|
| JP | 2000-174872 A | 6/2000 |
| JP | 2003-051875 A | 2/2003 |
| JP | 2004-023386 A | 1/2004 |
| JP | 3165298 U | 1/2011 |
| JP | 3169098 U | 7/2011 |

* cited by examiner

HOLDING PLATFORM FOR MOBILE INFORMATION TERMINALS, DESKTOP TELEPHONE, AND FIXING METHOD CONNECTOR FOR MOBILE INFORMATION TERMINALS

CROSS REFERENCE TO RELATED APPLICATION

This application is a National Stage of International Application No. PCT/JP2012/076374, filed Oct. 4, 2012, claiming priority from Japanese Patent Application No. 2011-232523, filed Oct. 24, 2011, the contents of which are incorporated herein by reference in their entirety.

TECHNICAL FIELD

This invention relates to a portable information terminal holding base that allows various operations such as battery charging while holding thereon a wide variety of portable information terminals, and to a desk phone and a method of fixing, to a portable information terminal holding base, a connector to be connected to a portable information terminal.

BACKGROUND ART

Nowadays, various portable information terminals such as a tablet terminal (multifunction portable device) and a smartphone (highly functional mobile phone) are put on the market. iPad (trademark) is known as a typical example of the tablet terminal, and iPhone (trademark) is known as a typical example of the smartphone. Those various portable information terminals are different in length and width sizes and positions of battery-charging slots each provided at a lower end thereof.

As is well known, a battery charger is provided to each portable information terminal as an auxiliary part. The battery charger includes a battery-charging plug connector, which is fixed to one end portion of a power supply cable, and an adapter including a plug, which is fixed to the other end portion of the power supply cable. To charge the portable information terminal, the plug of the adapter including a plug is generally inserted into a power outlet socket, and the battery-charging plug connector (terminal) is inserted into the battery-charging slot (terminal insertion hole) of the portable information terminal. Thus, a secondary battery (such as a lithium ion battery) built into the portable information terminal can be charged.

On the other hand, various holding bases (battery-charging bases) that allow various operations such as battery charging while holding thereon those portable information terminals have been proposed.

For example, Patent Literature 1 discloses a docking station that allows battery charging and data transmission for a variety of portable devices. In the docking station disclosed in Patent Literature 1, a connector plug to be inserted into a connector insertion groove of a bottom portion of a portable device elastically moves, together with a slide component, in a fore-and-aft direction in a slide opening of a fixed component. The distance varies between the connector plug and a support wall, and hence the docking station is compatible with a variety of portable devices.

Patent Literature 2 discloses a connector device capable of easily connecting a connector of a variety of mobile phones to a connector of a cradle that is usable for those mobile phones. In this connector device, a flange of a core that supports a connector body is sandwiched between a face plate and pressing plates that are pressed by springs, and hence the connector device can move the connector body in an up-and-down direction and a right-and-left direction with respect to a connector housing.

CITATION LIST

Patent Literature

Patent Literature 1: Japanese Utility Model Registration No. 3169098
Patent Literature 2: Japanese Unexamined Patent Application Publication (JP-A) No. Hei 11-354207

DISCLOSURE OF THE INVENTION

Problems to be Solved by the Invention

Patent Literatures 1 and 2, however, have the following problems.

In the docking station disclosed in Patent Literature 1, there is a problem in that the movable range of the connector plug is limited. Further, in Patent Literature 1, the connector plug is only movable in the fore-and-aft direction, and hence the docking station is only compatible with portable information terminals that are different in thickness. Therefore, there is a problem in that the docking station is not suited to arrangements of various portable information terminals that are different in length and width sizes.

Further, in Patent Literature 2, the connector body is movable in the up-and-down direction and the right-and-left direction, but the movable range of the connector body is limited. Therefore, there is a problem in that the connector device is not compatible with various portable information terminals that are significantly different in length and width sizes. Further, the connector device is fixed to the cradle, and hence there is a problem in that the connector device is only compatible with a connector provided to one type of mobile phone as an auxiliary part.

This invention has been made to solve the above-mentioned problems, and it is therefore an object of this invention to provide a portable information terminal holding base capable of fixing each of battery-charging plug connectors that are formed compatible with the specifications of the battery-charging slots in a plurality of types of portable information terminals that are different in length and width sizes and positions of battery-charging slots.

Means to Solve the Problems

In view of the above-mentioned problems, according to one embodiment of this invention, there is provided a portable information terminal holding base, including: a holding base main body having a main mounting surface inclined with respect to a horizontal surface, the holding base main body being configured to hold, on the main mounting surface, one of a plurality of types of portable information terminals including at least a first portable information terminal and a second portable information terminal that is different from the first portable information terminal in length and width size and position of a battery-charging slot provided at a lower end thereof; and a battery-charging cover removably mounted to the holding base main body, the battery-charging cover being configured to house a plurality of types of battery-charging plug connectors, which are formed compatible with specifications of battery-charging slots of the plurality of types of portable information terminals, respectively, the battery-charging cover being configured to: house, at a first fixing position, a battery-charging plug connector, which is formed compatible with specifications of a battery-charging slot of the first portable information terminal; and fix, when the second portable information terminal is to be held on the holding base main body, at a second fixing position different from the first fixing position in accordance with the length and width size of the second portable information terminal and the position of the battery-charging slot of the second portable information terminal, a battery-charging plug connector, which is formed compatible with specifications of the battery-charging slot of the second portable information terminal.

Further, according to another embodiment of this invention, there is provided a method of fixing a portable information terminal connector, the method including: holding, on a main mounting surface inclined with respect to a horizontal surface, one of a plurality of types of portable information terminals including at least a first portable information terminal and a second portable information terminal that is different from the first portable information terminal in length and width size and position of a battery-charging slot provided at a lower end thereof; housing, at a first fixing position, a battery-charging plug connector, which is formed compatible with specifications of a battery-charging slot of the first portable information terminal; and fixing, when the second portable information terminal is to be held on the main mounting surface, at a second fixing position different from the first fixing position in accordance with the length and width size of the second portable information terminal and the position of the battery-charging slot of the second portable information terminal, a battery-charging plug connector, which is formed compatible with specifications of the battery-charging slot of the second portable information terminal.

Effect of the Invention

According to one embodiment of this invention, the plurality of fixing positions compatible with the battery-charging plug connectors of the respective portable information terminals are provided to the portable information terminal holding base. Thus, it is possible to provide the portable information terminal holding base capable of fixing each of the battery-charging plug connectors provided to various portable information terminals as an auxiliary part.

Further advantages and embodiments of this invention are described below in detail by way of the description and drawings.

BEST MODE FOR EMBODYING THE INVENTION

Now, embodiments of this invention are described with reference to the drawings.

First Embodiment

Figure 1:
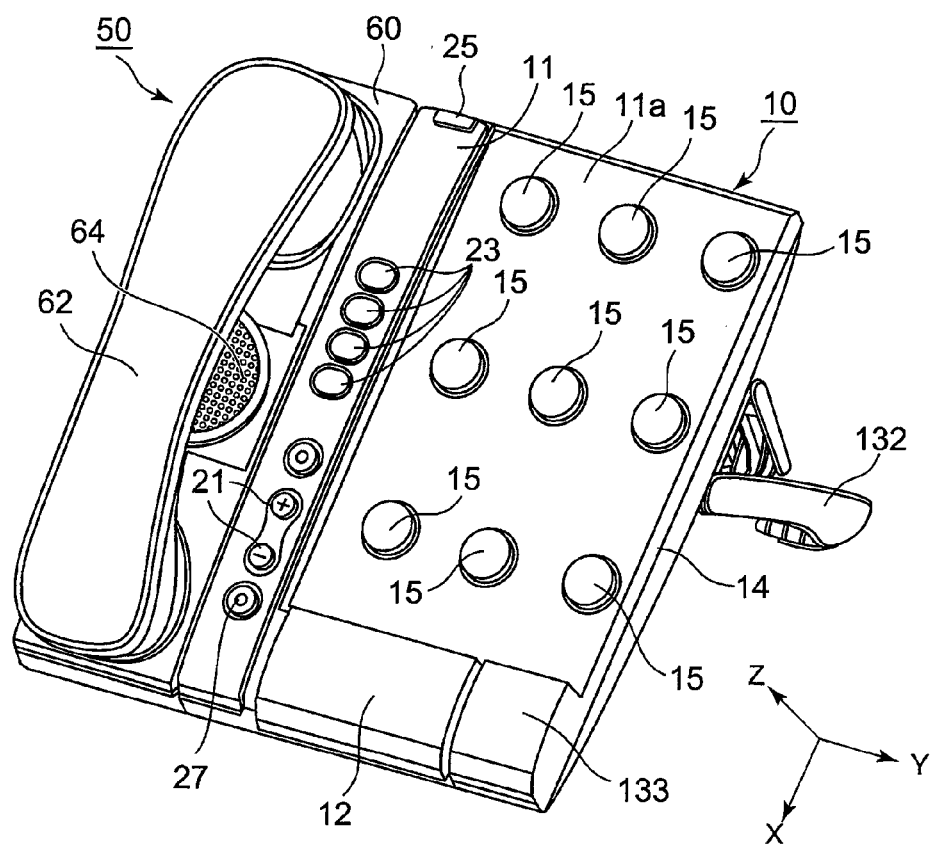
FIG. 1 is a perspective view illustrating a schematic configuration of a portable information terminal holding base according to a first embodiment of this invention.
Figure 2:
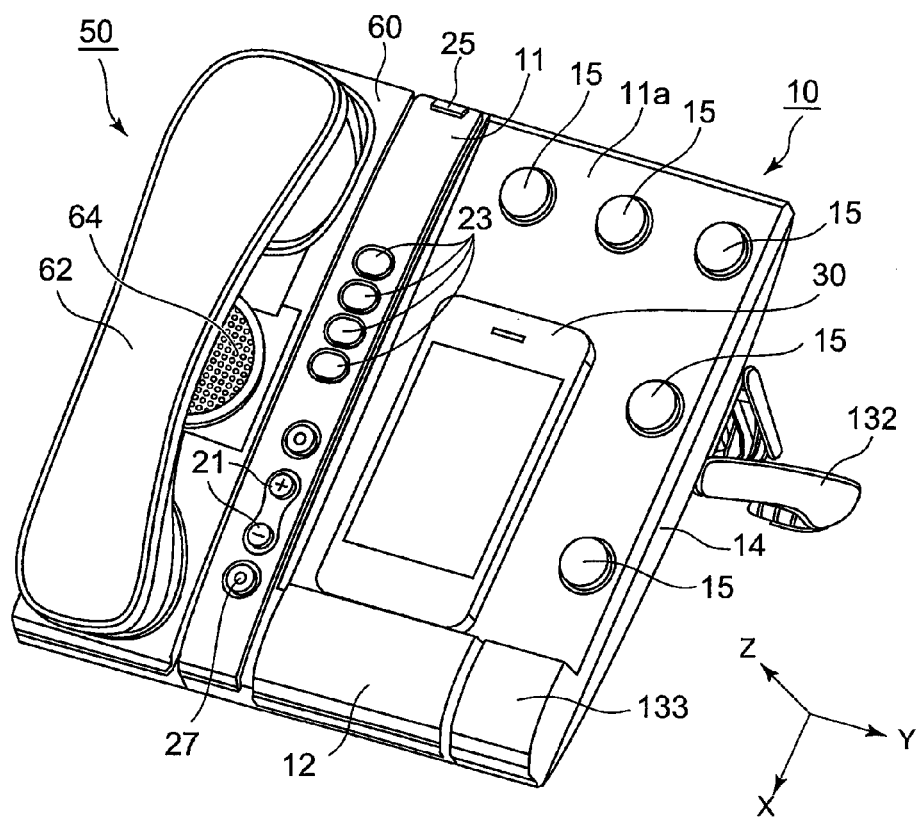
FIG. 2 is a perspective view illustrating a use state in which a portable information terminal is held on the portable information terminal holding base illustrated in FIG. 1.
Figure 3:
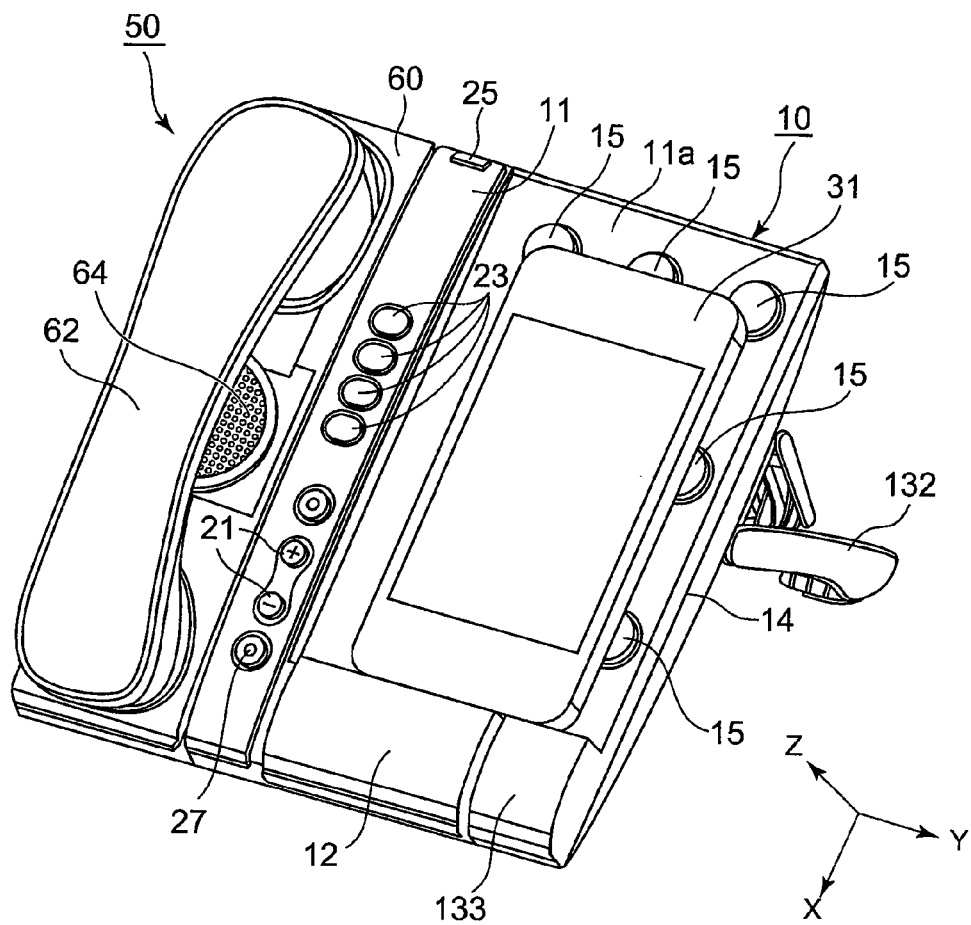
FIG. 3 is a perspective view illustrating a use state in which another portable information terminal is held on the portable information terminal holding base illustrated in FIG. 1.

FIGS. 1 to 3 illustrate a portable information terminal holding base 10 according to a first embodiment of this invention. FIG. 1 is a perspective view illustrating the portable information terminal holding base 10 according to the first embodiment of this invention. FIG. 2 is a perspective view illustrating a state in which a portable information terminal (smartphone having a substantially 3- to 4-inch display installed thereon) is mounted on the portable information terminal holding base 10 of this embodiment. FIG. 3 is a perspective view illustrating a state in which another portable information terminal (tablet terminal having a substantially 7-inch display installed thereon) is mounted on the portable information terminal holding base 10 of this embodiment.

The portable information terminal holding base 10 illustrated in the figures is a holding base capable of holding one of two types of portable information terminals including a first portable information terminal 30 (see FIG. 2) and a second portable information terminal 31 (see FIG. 3) that is different from the first portable information terminal in length and width size and position of a battery-charging slot provided at a lower end thereof. The portable information terminal holding base 10 is used as a battery-charging stand for a portable information terminal under a state in which one of the two types of portable information terminals is held on the portable information terminal holding base 10. Further, instead of using the portable information terminal holding base 10 as a battery-charging stand, the portable information terminal holding base 10 may be used as a holding base for data transfer.

In the example of the figures, the first portable information terminal 30 is a smartphone (highly functional mobile phone) such as iPhone having a substantially 3- to 4-inch display installed thereon, and the second portable information terminal 31 is a tablet terminal (multifunction portable device) such as Galaxy Tab having a substantially 7-inch display installed thereon.

The portable information terminal holding base 10 illustrated in the figures includes a holding base main body 11 having a main mounting surface 11a inclined at a predetermined angle with respect to a horizontal surface such as a desk. The holding base main body 11 includes a leg 132 (shown) on its back surface, for supporting the holding base main body 11. Thus, the leg 132 allows the main mounting surface 11a to be inclined at the predetermined angle with respect to the horizontal surface.

As illustrated in FIGS. 1 to 3, a Cartesian coordinate system (X,Y,Z) is used herein. In the state illustrated in FIGS. 1 to 3, in the Cartesian coordinate system (X,Y,Z), the X-axis direction refers to a fore-and-aft direction (depth direction) extending parallel to the main mounting surface 11a, the Y-axis direction refers to a right-and-left direction (width direction) extending parallel to the main mounting surface 11a and orthogonal to the X-axis direction, and the Z-axis direction refers to an up-and-down direction (height direction) orthogonal to the main mounting surface 11a.

Now, components of the portable information terminal holding base 10 according to this embodiment are described in detail.

The portable information terminal holding base 10 includes a terminal cover 12 to be fixed to a lower end of the main mounting surface 11a. FIG. 1 illustrates a state in which the terminal cover 12 is fixed to the lower end of the main mounting surface 11a. The terminal cover 12 is configured to support a lower end of one of the above-mentioned two types of portable information terminals 30 and 31 to be held on the main mounting surface 11a. Further, the terminal cover 12 is configured to house a battery-charging plug connector 17-1 or 17-2 inside. Therefore, when the portable information terminal 30 or 31 is mounted on the main mounting surface 11a as illustrated in FIGS. 2 and 3, the battery-charging plug connector 17-1 or 17-2 housed in the terminal cover 12 is inserted into the battery-charging slot of the portable information terminal 30 or 31, and thus battery charging and data transfer can be performed on the portable information terminal 30 or 31.

In the portable information terminal holding base 10, a side plate 14 is removably arranged on a first side edge portion side (in the example of the figures, on a right edge portion side) of the holding base main body 11.

The portable information terminal holding base 10 further includes nine cushions 15 formed on the main mounting surface 11a. In the example of the figures, the portable information terminal holding base 10 includes the nine cushions 15, but the cushions 15 are not limited to the nine cushions, and only need to be a plurality of cushions. However, it is preferred that the cushions 15 be arranged in matrix as illustrated in FIG. 1.

Further, the portable information terminal holding base 10 illustrated in the figures includes volume buttons 21, a plurality of function buttons 23, an incoming call lamp 25, and a Bluetooth (trademark) module cooperation button 27 at a second side edge portion (in the example of the figures, at a left edge portion) of the holding base main body 11. Further, the holding base main body 11 includes a stopper 133 for supporting the lower end of the second portable information terminal (tablet terminal) 31.

The portable information terminal holding base 10 illustrated in the figures is combined integrally with a call receiver section 60 provided on the second side edge portion side (in the example of the figures, on the left edge portion side) of the holding base main body 11, to thereby serve as a desk phone 50. The call receiver section 60 includes a handset 62 and a loudspeaker 64.

Description is given of an example of an operation to be performed in the case where the first portable information terminal (smartphone) 30 is held on the main mounting surface 11a in the configuration in which the portable information terminal holding base 10 and the call receiver section 60 are combined with each other (desk phone 50).

The first portable information terminal (smartphone) 30 has well-known Bluetooth installed thereon. On the other hand, the desk phone 50 illustrated in the figures has a Bluetooth module (not shown) installed thereon. Thus, when the Bluetooth module cooperation button 27 is depressed, the user can make phone conversations through use of the handset 62. In this case, the operation of making phone conversations is performed in the first portable information terminal (smartphone) 30. This operation of making phone conversations is also applicable to the case where the second portable information terminal (tablet terminal) 31 is held on the main mounting surface 11a.

Note that, the desk phone 50 itself can be used as an Internet Protocol (IP) phone compliant with the RFC-3261 protocol. That is, the desk phone 50 has a fixed number as the IP phone. However, the desk phone 50 illustrated in the figures does not include any dial button, and hence the desk phone 50 can only receive incoming calls.

Next, referring to FIGS. 4 to 7, detailed description is given of the terminal cover 12 to be fixed to the lower end of the main mounting surface 11a of the portable information terminal holding base 10.

Figure 4:
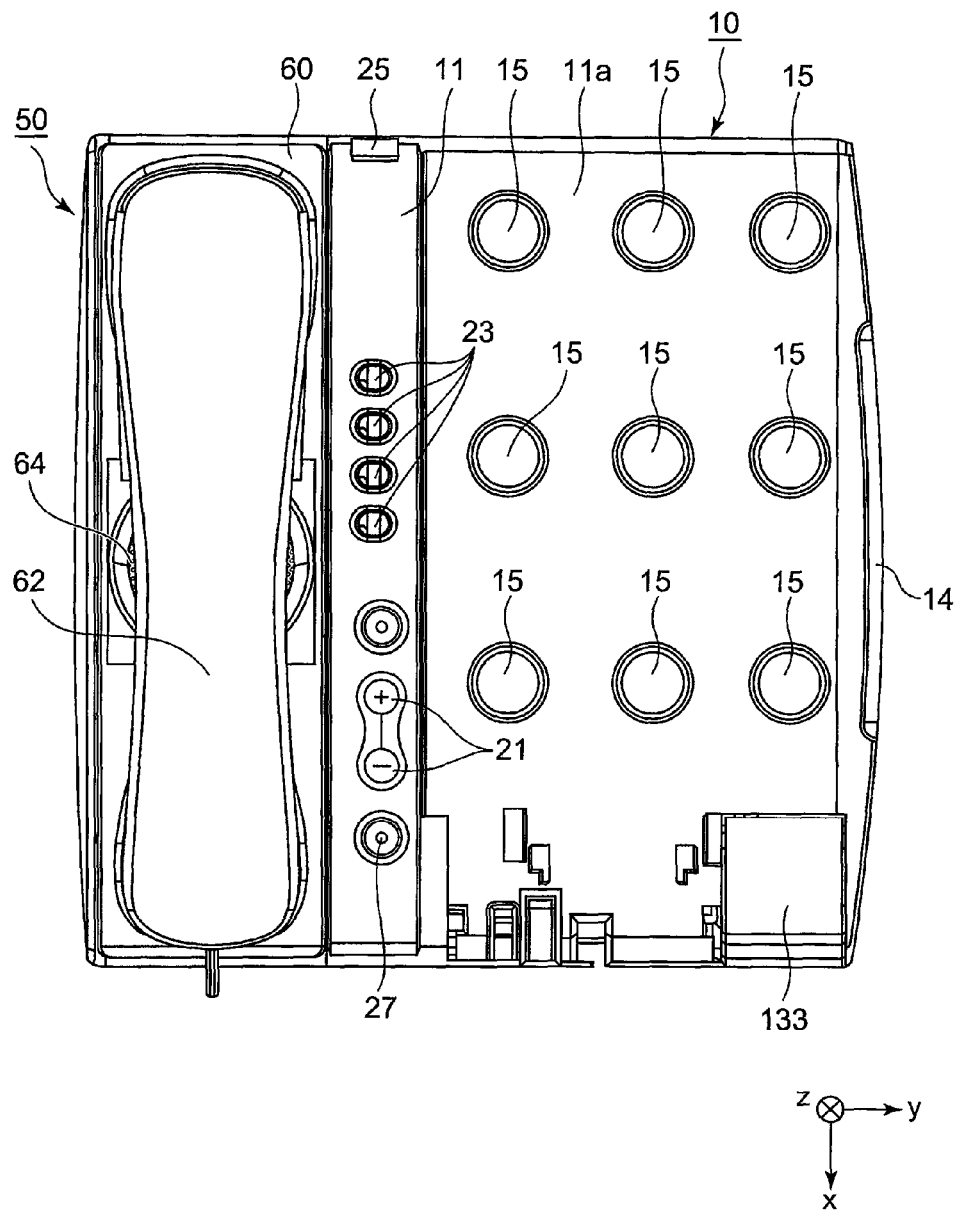
FIG. 4 is a front view illustrating the configuration of the portable information terminal holding base according to the first embodiment of this invention.
Figure 5:
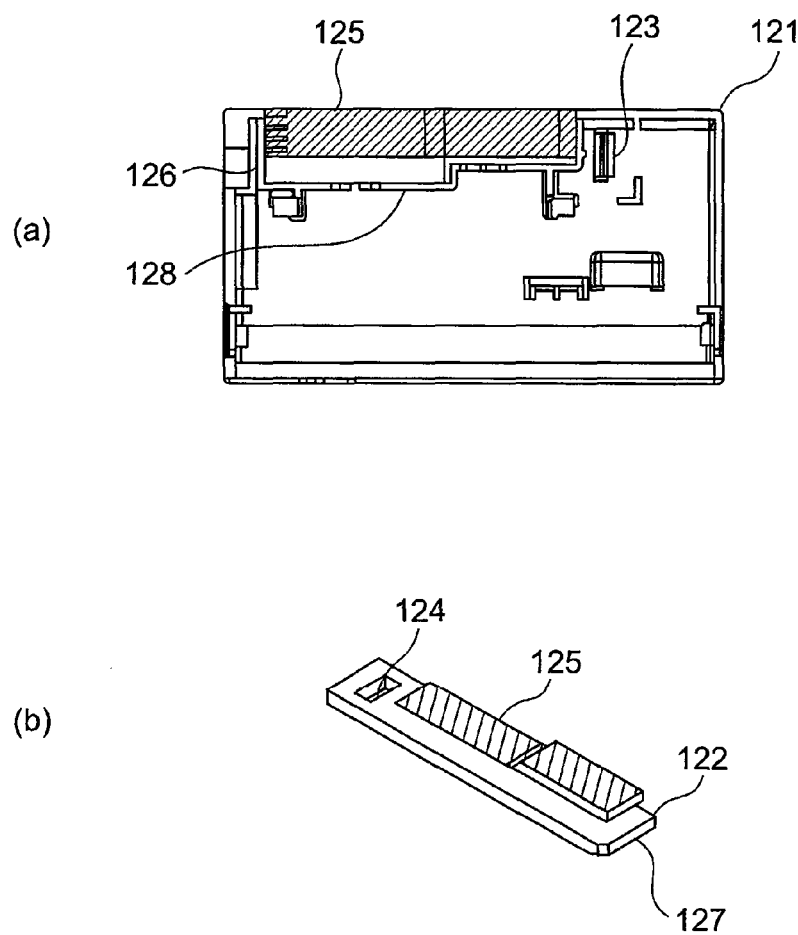
FIG. 5 includes (a) and (b) which are schematic views illustrating an internal configuration of a terminal cover of the portable information terminal holding base according to the first embodiment of this invention.
Figure 6:
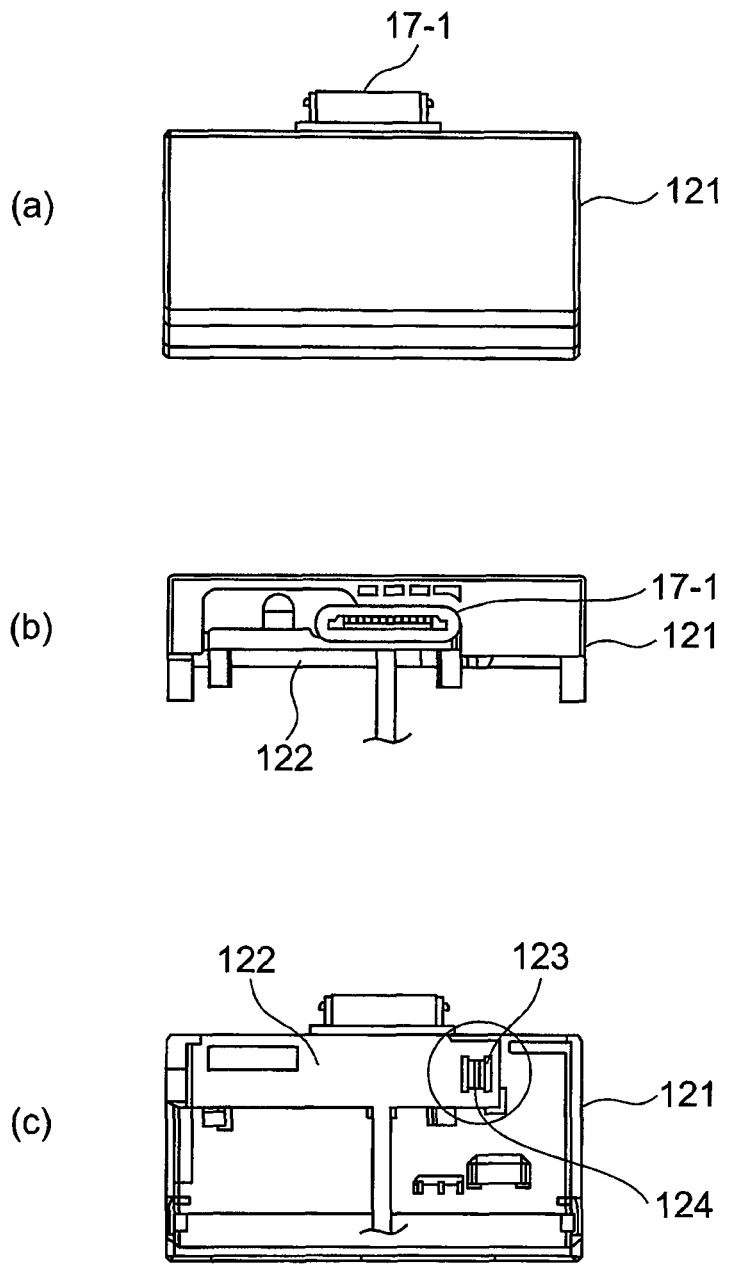
FIG. 6 includes (a) to (c) all of which are configuration views illustrating a state in which a battery-charging plug connector is fixed to the terminal cover of the portable information terminal holding base according to the first embodiment of this invention. Specifically, (a) is a front view, (b) is a top view, and (c) is a rear view.
Figure 7:
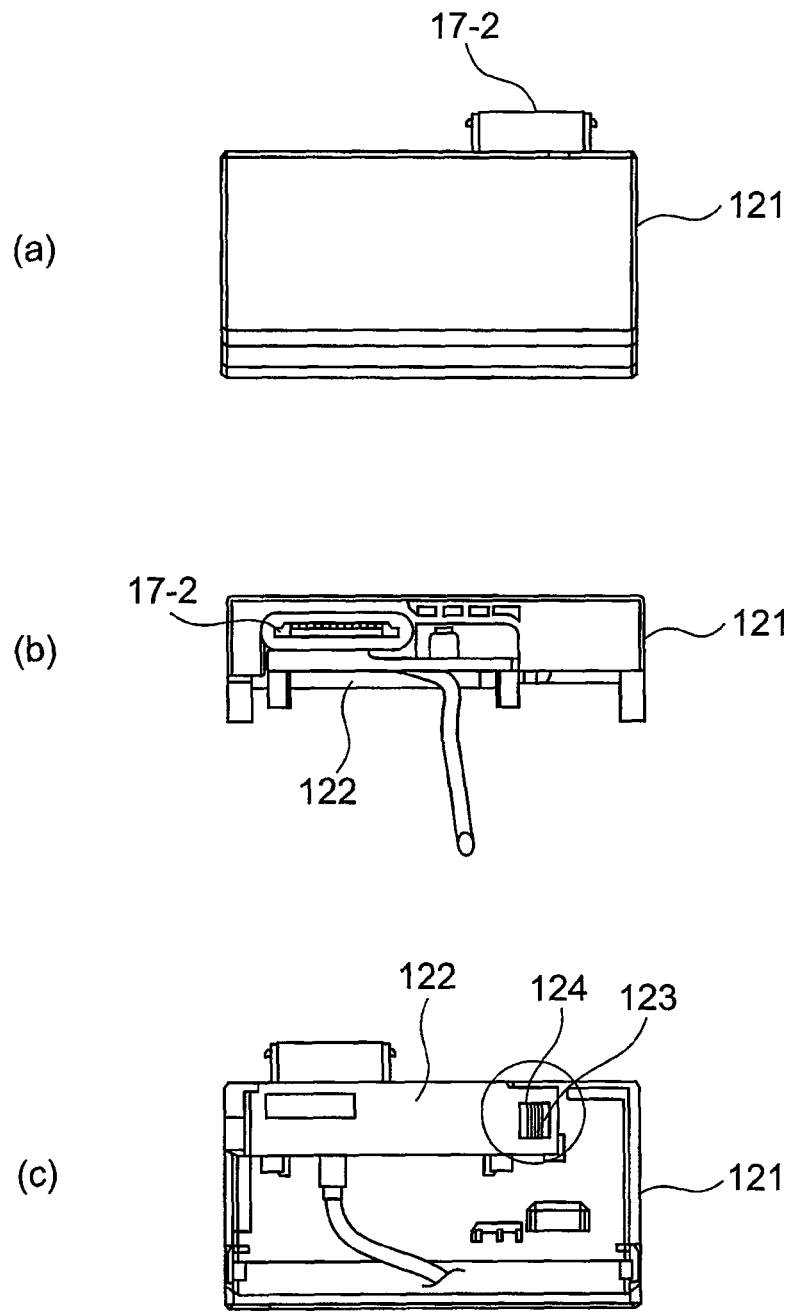
FIG. 7 includes (a) to (c) all of which are configuration views illustrating a state in which the battery-charging plug connector is fixed to another position on the terminal cover of the portable information terminal holding base according to the first embodiment of this invention. Specifically, (a) is a front view, (b) is a top view, and (c) is a rear view.

FIG. 4 is a front view illustrating a state in which the terminal cover 12 is removed from the portable information terminal holding base 10. FIG. 5 are explanatory schematic views illustrating an internal configuration of the terminal cover 12. FIG. 6 are views illustrating a state in which the battery-charging plug connector 17-1 is fixed to a first fixing position on the terminal cover 12. FIG. 7 are views illustrating a state in which the other battery-charging plug connector 17-2 is fixed to a second fixing position on the terminal cover 12.

FIG. 4 illustrates a configuration in which the terminal cover 12 is removed from the main mounting surface 11a of the portable information terminal holding base 10 of FIG. 1. As illustrated in the figure, grooves and claws for fixing the terminal cover 12 are formed on the main mounting surface 11a at a position where the terminal cover 12 is to be fixed. Under a state in which the terminal cover 12 is fixed, the terminal cover 12 is latched onto the main mounting surface 11a of the portable information terminal holding base 10 with the claws. When the terminal cover 12 is pushed in a horizontal direction toward the cushions 15 that are arranged in the X-direction extending parallel to the main mounting surface 11a, the terminal cover 12 can be removed from the main mounting surface 11a. Further, when the terminal cover 12 is to be fixed, the terminal cover 12 can be fixed to the main mounting surface 11a through a reverse operation.

As illustrated in FIG. 5, the terminal cover 12 to be fixed to the main mounting surface 11a of the portable information terminal holding base 10 according to the embodiment of this invention includes a terminal housing section 121 and a terminal pressing plate 122.

The terminal housing section 121 illustrated in FIG. 5(a) has a space secured to house the battery-charging plug connector 17-1 or 17-2 inside (see FIGS. 6 and 7). Therefore, the battery-charging plug connector 17-1 or 17-2 can be housed at the first fixing position or the second fixing position in the space formed in the terminal housing section 121 in accordance with the dimensions of the battery-charging plug connector 17-1 or 17-2. The battery-charging plug connectors 17-1 and 17-2 are formed compatible with the specifications of the battery-charging slots in the respective portable information terminals. Further, the terminal housing section 121 includes a latching claw 123, a fitting groove 126, and a taper 128 for fixing the terminal pressing plate 122.

The terminal pressing plate 122 illustrated in FIG. 5(b) has a latching hole 124 provided at one end thereof, and an insertion portion 127 formed into a tapered shape at the other end thereof. When the terminal pressing plate 122 is to be fixed to the terminal housing section 121, the insertion portion 127 is fitted into the fitting groove 126, and then the latching claw 123 formed on the terminal housing section 121 is engaged with the latching hole 124 of the terminal pressing plate 122.

An adsorption sheet 125 indicated by the hatched lines may be arranged at an inner wall of each of the first fixing position and the second fixing position on the terminal housing section 121 (see FIG. 5(a)). Further, an adsorption sheet 125 indicated by the hatched lines is also arranged at an inner wall of the terminal pressing plate 122 that faces the respective fixing positions when the terminal pressing plate 122 is fixed to the terminal housing section 121 (see FIG. 5(b)). Examples of the adsorption sheet include a special sheet having a thickness of 0.3 min that is releasable and having micropores formed therein repeatedly, but the adsorption sheet is not limited to this configuration, and any member may be employed as long as the member is capable of more firmly fixing the battery-charging plug connector 17-1 or 17-2.

Referring to FIGS. 6 and 7, description is given of the case where the battery-charging plug connector 17-1 or 17-2 is to be fixed into the terminal cover 12.

As illustrated in FIGS. 6(a) to 6(c), the battery-charging plug connector 17-1 is fixed to the first fixing position while being sandwiched between the terminal housing section 121 and the terminal pressing plate 122. In this embodiment, the battery-charging plug connector 17-1 is provided, as an auxiliary part, to the smartphone having a substantially 3- to 4-inch display installed thereon. At the first fixing position, the battery-charging plug connector 17-1 is fixed while being sandwiched between the terminal housing section 121 and the terminal pressing plate 122. In addition, the lower end of the battery-charging plug connector 17-1 is supported by the taper 128 formed on the terminal housing section 121, and the battery-charging plug connector 17-1 is further caused to adhere to the adsorption sheets 125. In this manner, the battery-charging plug connector 17-1 can be fixed firmly.

As illustrated in FIGS. 7(a) to 7(c), the battery-charging plug connector 17-2 is fixed to the second fixing position while being sandwiched between the terminal housing section 121 and the terminal pressing plate 122. The battery-charging plug connector 17-2 is provided, as an auxiliary part, to the tablet terminal having a substantially 7-inch display installed thereon. Therefore, the battery-charging plug connector 17-2 has larger dimensions than the battery-charging plug connector 17-1 in accordance with the length and width size of the tablet terminal and the position of the battery-charging slot provided at the lower end of the tablet terminal. At the second fixing position, the battery-charging plug connector 17-2 is fixed while being sandwiched between the terminal housing section 121 and the terminal pressing plate 122. In addition, the lower end of the battery-charging plug connector 17-2 is supported by the taper 128 formed on the terminal housing section 121, and the battery-charging plug connector 17-2 is further caused to adhere to the adsorption sheets 125. In this manner, the battery-charging plug connector 17-2 can be fixed firmly.

As described above, each of the battery-charging plug connectors 17-1 and 17-2 that are formed compatible with the specifications of the battery-charging slots in the first portable information terminal (smartphone) 30 and the second portable information terminal (tablet terminal) 31 can be fixed to the predetermined position on the terminal cover 12 that is fixed to the portable information terminal holding base 10. The battery-charging plug connector 17-1 or 17-2 is connected to a power outlet socket through an adapter (not shown) and a power supply cable (not shown) provided inside the portable information terminal holding base 10. Thus, through the insertion of the battery-charging connector 17-1 or 17-2 into the battery-charging slot of the corresponding portable information terminal 30 or 31, a secondary battery (lithium ion battery) built into the above-mentioned portable information terminal 30 or 31 can be charged.

Further, a charging battery (not shown) may be provided on the back surface of the holding base main body 11. In this case, the battery-charging plug connector 17-1 or 17-2 can be connected to the above-mentioned charging battery through the adapter and the power supply cable provided inside the portable information terminal holding base 10. Therefore, the secondary battery (lithium ion battery) built into the first or second portable information terminal 30 or 31 can easily be charged even in an environment without the power outlet socket, and in an event of power outage.

Note that, in this embodiment, there is described a configuration in which the call receiver section 60 that may be added to the portable information terminal holding base 10 illustrated in the respective figures is mounted to the portable information terminal holding base 10. Alternatively, the call receiver section 60 may be removed so that the portable information terminal holding base 10 is used alone.

In the above-mentioned first embodiment of this invention, the following effects are attained.

The first effect is that the single portable information terminal holding base 10 can hold and charge the variety of portable information terminals 30 and 31. The reason is because the plurality of fixing positions compatible with the battery-charging plug connectors 17-1 and 17-2 of the respective portable information terminals 30 and 31 are provided in the terminal cover 12.

The second effect is that the battery-charging plug connectors 17-1 and 17-2 can be fixed and removed easily. The reason is because the adsorption sheets 125 that are releasable repeatedly are arranged in the terminal cover 12 including the terminal housing section 121 and the terminal pressing plate 122.

The third effect is that the various portable information terminals 30 and 31 can be charged easily. The reason is because the charging battery is arranged on the back surface of the holding base main body 11.

Second Embodiment

Next, a second embodiment of this invention is described. The second embodiment of this invention is a modification example of the above-mentioned first embodiment. In this embodiment, the parts having similar functions to those of the parts described in the first embodiment are hereinafter represented by the same reference symbols, and description thereof is therefore omitted herein.

Figure 8:
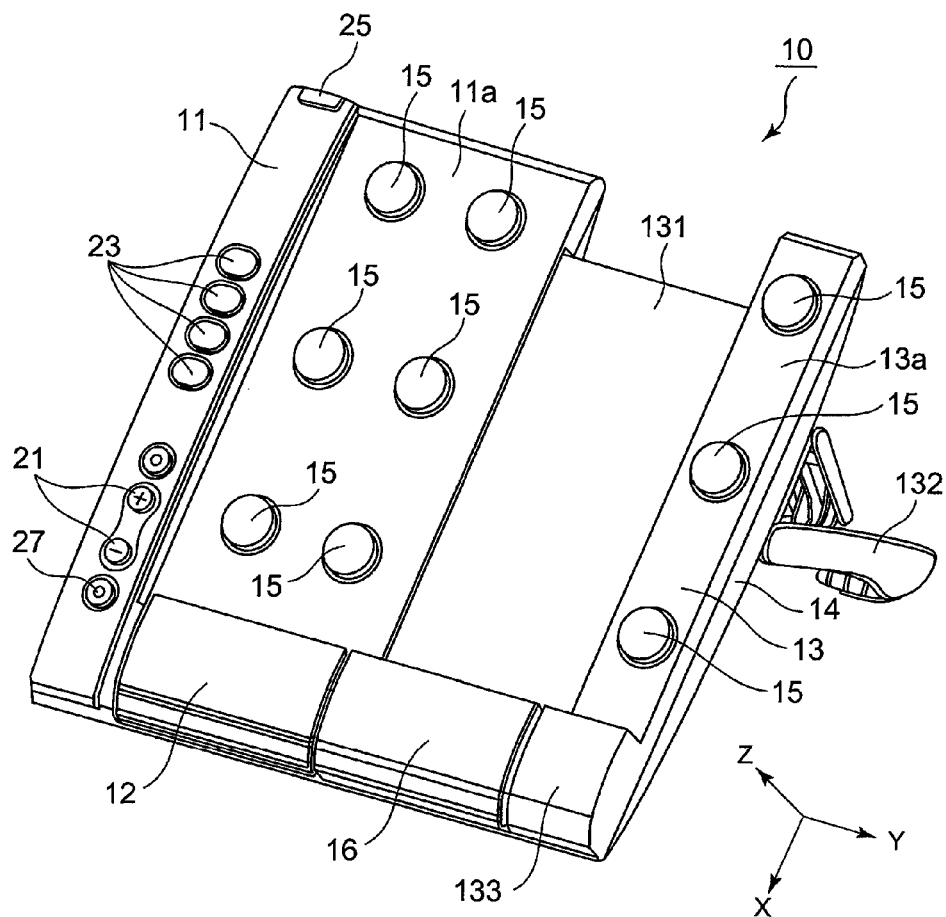
FIG. 8 is a perspective view illustrating a schematic configuration of a portable information terminal holding base according to a second embodiment of this invention.
Figure 9:
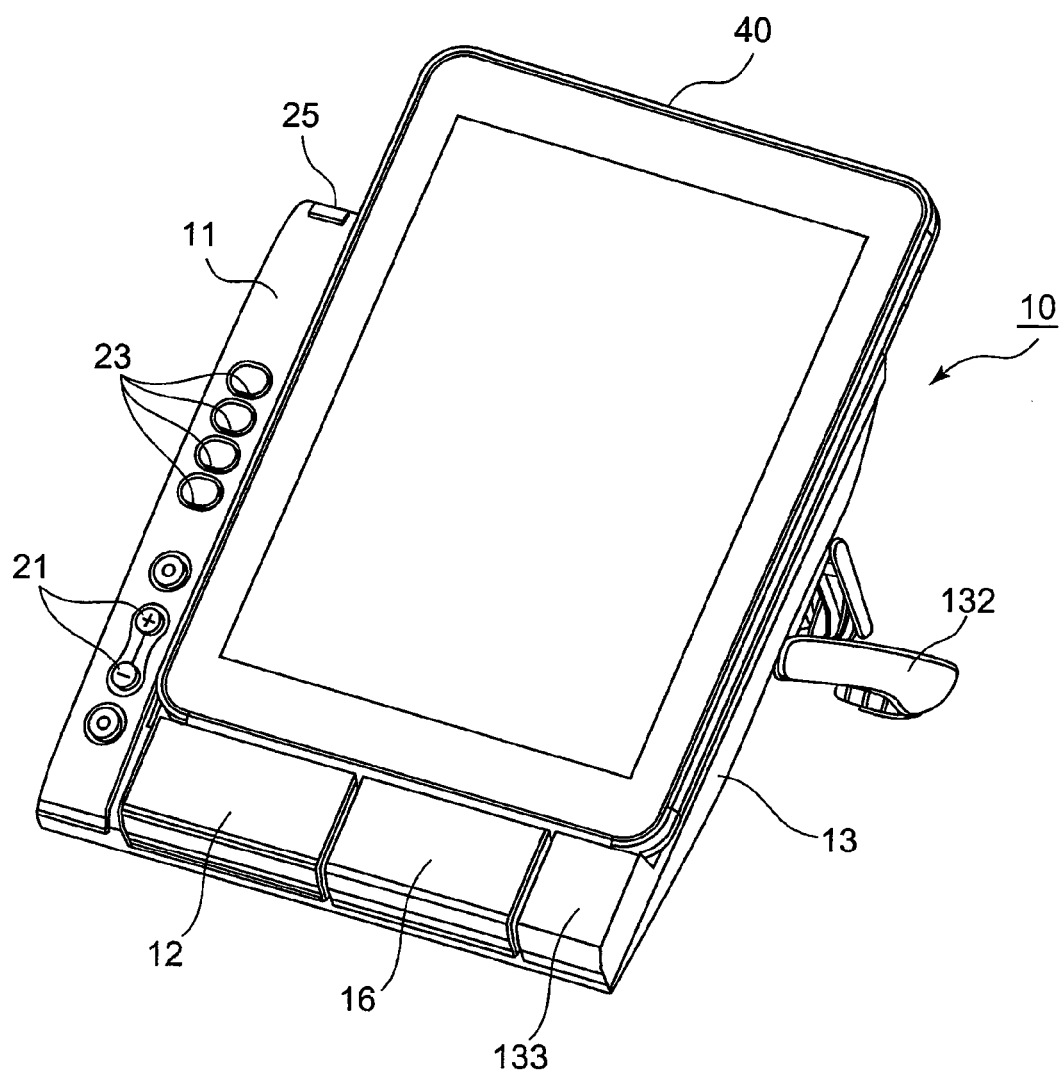
FIG. 9 is a perspective view illustrating a use state in which a portable information terminal is held on the portable information terminal holding base illustrated in FIG. 8.
Figure 10:
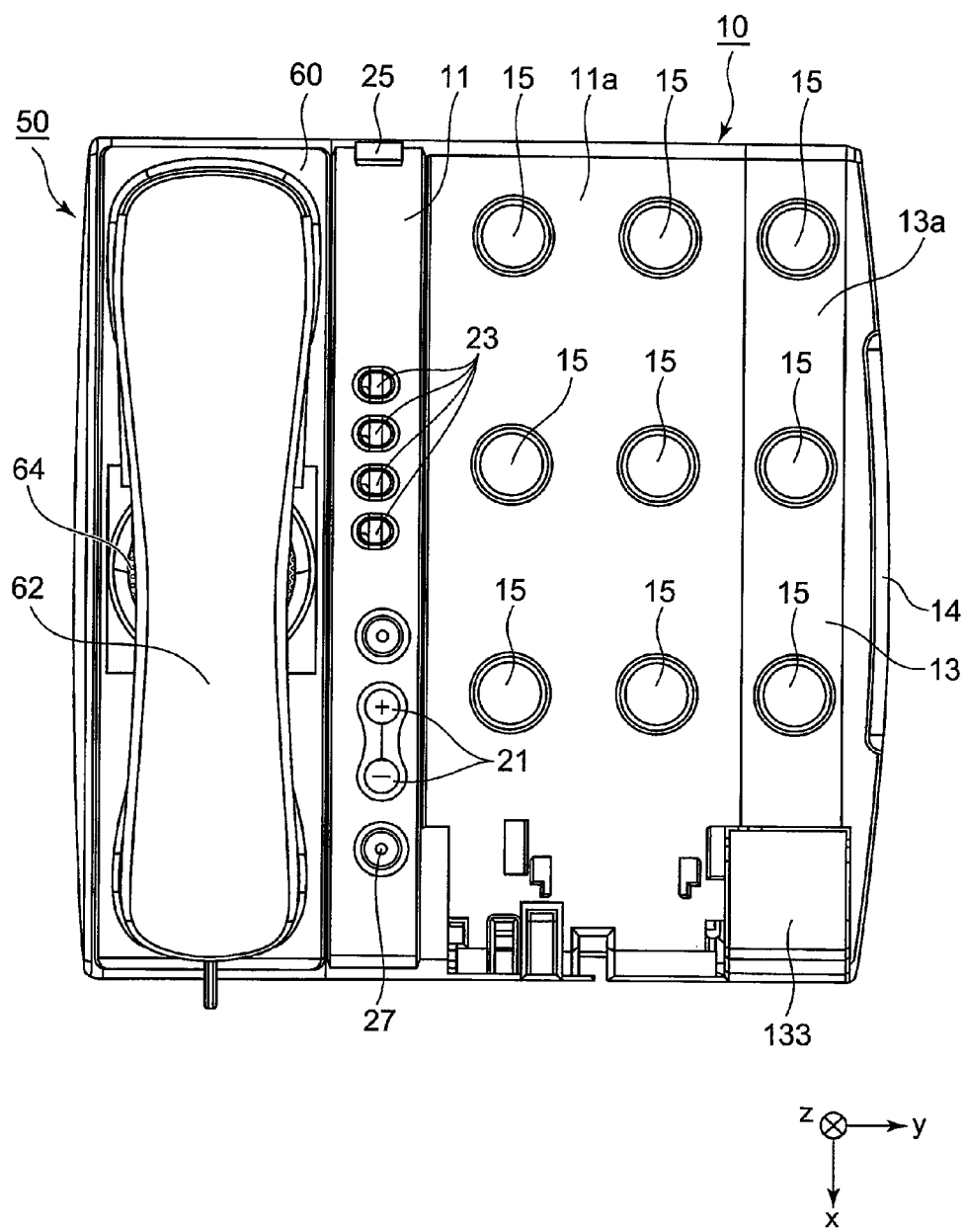
FIG. 10 is a front view illustrating the configuration of the portable information terminal holding base according to the second embodiment of this invention.

As illustrated in FIGS. 8 to 10, the Cartesian coordinate system (X,Y,Z) is used herein. In the state illustrated in FIGS. 8 to 10, in the Cartesian coordinate system (X,Y,Z), the X-axis direction refers to the fore-and-aft direction (depth direction) extending parallel to the main mounting surface 11a, the Y-axis direction refers to the right-and-left direction (width direction) extending parallel to the main mounting surface 11a and orthogonal to the X-axis direction, and the Z-axis direction refers to the up-and-down direction (height direction) orthogonal to the main mounting surface 11a.

FIGS. 8 to 10 illustrate a portable information terminal holding base 10 according to the second embodiment of this invention. FIG. 8 is a perspective view illustrating the portable information terminal holding base 10 according to the second embodiment of this invention. FIG. 9 is a perspective view illustrating a state in which a portable information terminal (tablet terminal having a substantially 10-inch display installed thereon) is mounted on the portable information terminal holding base 10 of this embodiment. FIG. 10 is a front view illustrating a state in which the terminal cover 12 is removed from the lower end of the main mounting surface 11a of the portable information terminal holding base 10 of this embodiment.

The portable information terminal holding base 10 illustrated in the figures is a holding base capable of holding one of three types of portable information terminals including the first portable information terminal 30 (see FIG. 2) and the second portable information terminal 31 (see FIG. 3) described above, and also including a third portable information terminal 40 (see FIG. 9) that is different from the portable information terminals 30 and 31 in length and width size and position of a battery-charging slot provided at a lower end thereof. The portable information terminal holding base 10 can be used as a battery-charging stand for a portable information terminal under a state in which one of the three types of portable information terminals is held on the portable information terminal holding base 10. Further, instead of using the portable information terminal holding base 10 as a battery-charging stand, the portable information terminal holding base 10 may be used as a holding base for data transfer.

In the example of the figures, the third portable information terminal 40 is a tablet terminal (multifunction portable device) such as iPad having a substantially 10-inch display installed thereon. As compared to the first portable information terminal 30 having the minimum length and width size, the third portable information terminal 40 has the maximum length and width size that is twice or more as large as the minimum length and width size of the first portable information terminal 30. Further, the battery-charging slot provided at the lower end of the third portable information terminal 40 is also different from that of the first portable information terminal 30.

The portable information terminal holding base 10 includes an extensible holding member 13 provided on the first side edge portion side (in the example of the figures, on the right edge portion side) of the holding base main body 11. The extensible holding member 13 includes a slide plate 131 that is slidable inside the holding base main body 11 in a direction away from the holding base main body 11 (in the example of the figures, in a rightward direction) (see FIG. 8). The extensible holding member 13 has an extensible mounting surface 13a that is movable in parallel to the main mounting surface 11a. The extensible holding member 13 includes a leg 132 similar to the above-mentioned leg of the holding base main body 11 on a back surface of the extensible holding member 13. Thus, the leg 132 allows the extensible mounting surface 13a to be inclined at a predetermined angle with respect to the horizontal surface.

Note that, in the example of the figures, the slide plate 131 is formed of a single slide plate alone, but the slide plate 131 is not limited to the single slide plate, and may be formed of a plurality of slide plates. That is, the slide plate may be formed of a plurality of slide plates each extending in the right-and-left direction Y.

The extensible holding member 13 illustrated in the figures is removable from the holding base main body 11. Further, a side plate 14 is removably arranged on a side edge portion side (in the example of the figures, on a right edge portion side) of the extensible holding member 13 of the portable information terminal holding base 10. When the extensible holding member 13 is to be removed from the holding base main body 11, the side plate 14 may be removed, and the removed side plate 14 may be fixed to the first side edge portion side (in the example of the figures, to the right edge portion side) of the holding base main body 11. In this manner, the portable information terminal holding base 10 may be used in a compact manner.

When the extensible holding member 13 is extended to a predetermined extension position as illustrated in FIG. 9, the extensible holding member 13 can hold the third portable information terminal (tablet terminal) 40 in cooperation with the above-mentioned holding base main body 11. The extensible holding member 13 includes a stopper 133 for supporting the lower end of the third portable information terminal (tablet terminal) 40 when the extensible mounting surface 13a is extended to the predetermined extension position.

In the example of the figures, six cushions 15 are formed on the main mounting surface 11a, and three cushions 15 are formed on the extensible mounting surface 13a.

As illustrated in FIG. 8, the portable information terminal holding base 10 further includes an expansion battery-charging cover 16 to be fixed to a lower end of the slide plate 131 at a position between the main mounting surface 11a and the extensible mounting surface 13a when the extensible holding member 13 is extended to the predetermined extension position.

Next, referring to FIGS. 8 and 9, description is given of a case where the third portable information terminal (tablet terminal) 40 is to be held on the portable information terminal holding base 10.

In this case, in the portable information terminal holding base 10, as illustrated in FIG. 8, the terminal cover 12 is fixed to the lower end of the main mounting surface 11a, the extensible holding member 13 is extended to the predetermined extension position, and the expansion battery-charging cover 16 is fixed to the lower end of the slide plate 131.

Thus, as illustrated in FIG. 9, the lower end of the third portable information terminal (tablet terminal) 40 is supported by the terminal cover 12, the expansion battery-charging cover 16, and the stopper 133 of the extensible holding member 13, and thus the third portable information terminal (tablet terminal) 40 can be held on the main mounting surface 11a and the extensible mounting surface 13a.

Next, referring to FIGS. 11(a) to 11(d), detailed description is given of the expansion battery-charging cover 16 to be fixed to the lower end of the slide plate 131 at the position between the main mounting surface 11a and the extensible mounting surface 13a of the portable information terminal holding base 10 according to this embodiment.

Figure 11:
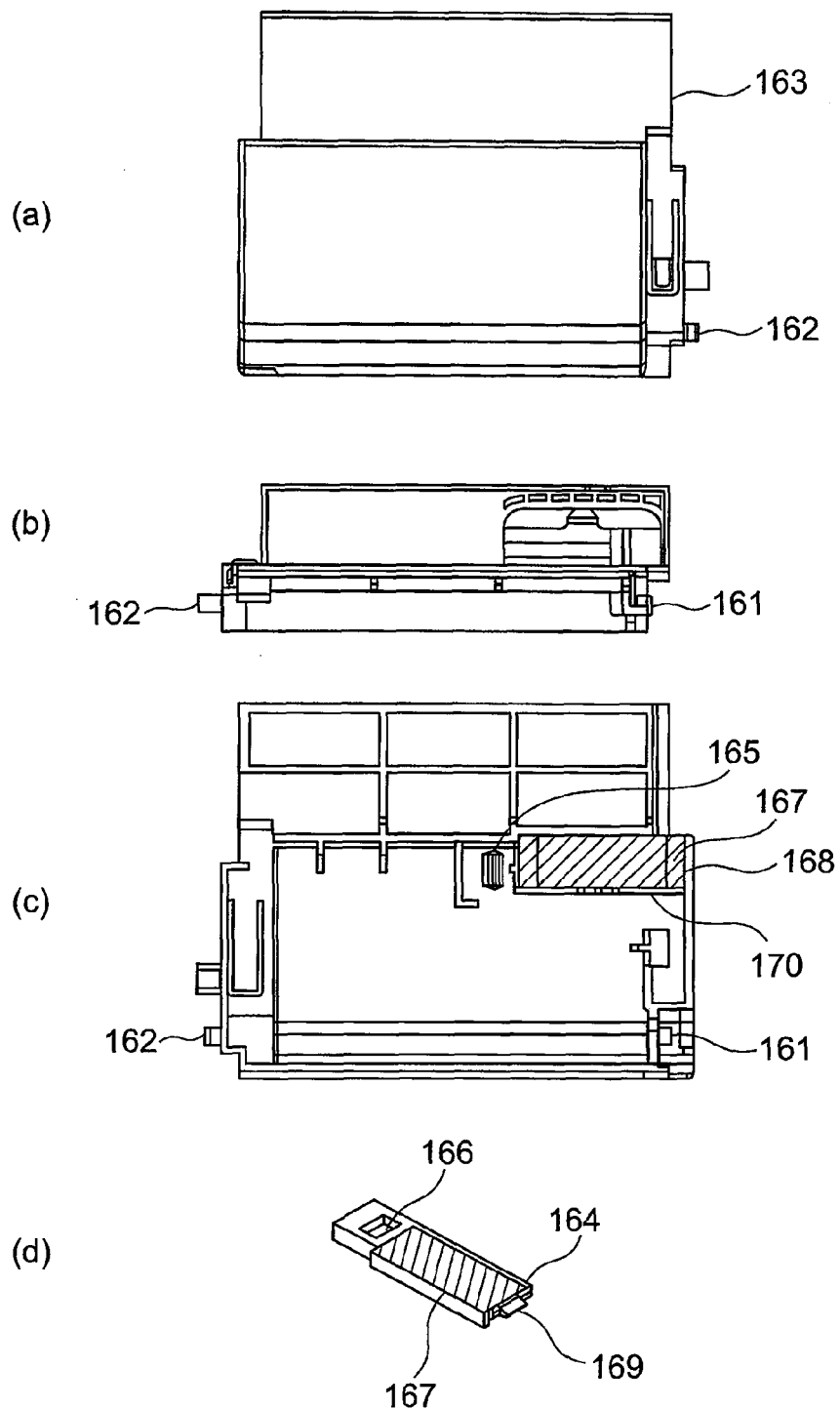
FIG. 11 includes (a) to (d) all of which are configuration views illustrating an expansion battery-charging cover provided as a separate piece and fixed to the portable information terminal holding base according to the second embodiment of this invention. Specifically, (a) is a front view, (b) is a top view, (c) is a rear view, and (d) is a perspective view illustrating an expansion terminal pressing plate.

FIG. 11(a) is a front view illustrating an expansion terminal housing section 163. FIG. 11(b) is a top view illustrating the expansion terminal housing section 163. FIG. 11(*c*) is a rear view illustrating the expansion terminal housing section 163. FIG. 11(*d*) is a perspective view illustrating an expansion terminal pressing plate 164.

As illustrated in FIGS. 11(*a*) to 11(*d*), the expansion battery-charging cover 16 includes the expansion terminal housing section 163 and the expansion terminal pressing plate 164. The expansion terminal housing section 163 illustrated in FIG. 11(*a*) has a space secured to house a battery-charging plug connector 17-3 (not shown) inside. Therefore, the battery-charging plug connector 17-3 can be housed at a third fixing position in the space formed in the expansion terminal housing section 163 so as to be compatible with the dimensions of the battery-charging plug connector 17-3 provided to the portable information terminal 40 as an auxiliary part. The battery-charging plug connector 17-3 is formed compatible with the specifications of the battery-charging slot in the portable information terminal 40. Further, the expansion terminal housing section 163 includes a latching claw 165, a fitting groove 168, and a taper 170 for fixing the expansion terminal pressing plate 164.

The expansion terminal pressing plate 164 illustrated in FIG. 11(*d*) has a latching hole 166 provided at one end thereof, and an insertion portion 169 formed at the other end thereof. When the expansion terminal pressing plate 164 is to be fixed to the expansion terminal housing section 163, the insertion portion 169 is fitted into the fitting groove 168, and then the latching claw 165 formed on the expansion terminal housing section 163 is engaged with the above-mentioned latching hole 166 of the expansion terminal pressing plate 164.

An adsorption sheet 167 indicated by the hatched lines is arranged at an inner wall of each of the third fixing position on the expansion terminal housing section 163 that forms the expansion battery-charging cover 16. Further, an adsorption sheet 167 indicated by the hatched lines is also arranged at an inner wall of the expansion terminal pressing plate 164 that faces the third fixing position when the expansion terminal pressing plate 164 is fixed to the expansion terminal housing section 163. Examples of the adsorption sheet 167 include a special sheet having a thickness of 0.3 mm that is releasable and having micropores formed therein repeatedly, but the adsorption sheet is not limited to this configuration, and any member may be employed as long as the member is capable of more firmly fixing the battery-charging plug connector 17-3.

Thus, the battery-charging plug connector 17-3 is fixed to the third fixing position in the expansion battery-charging cover 16 while being sandwiched between the expansion terminal housing section 163 and the expansion terminal pressing plate 164 described above. In this embodiment, the battery-charging plug connector 17-3 is provided, as an auxiliary part, to the portable information terminal 40 having a substantially 10-inch display installed thereon. Further, at the third fixing position, the battery-charging plug connector 17-3 is fixed while being sandwiched between the expansion terminal housing section 163 and the expansion terminal pressing plate 164. In addition, the lower end of the battery-charging plug connector 17-3 is supported by the taper 170 formed on the expansion terminal housing section 163, and the battery-charging plug connector 17-3 is further caused to adhere to the adsorption sheet 167. In this manner, the battery-charging plug connector 17-3 can be fixed firmly.

The battery-charging plug connector 17-3 is connected to the power outlet socket through the adapter (not shown) and the power supply cable (not shown) provided inside the portable information terminal holding base 10. Thus, through the insertion of the battery-charging connector 17-3 into the battery-charging slot of the above-mentioned portable information terminal 40, a secondary battery (lithium ion battery) built into the above-mentioned portable information terminal 40 can be charged. Further, the battery-charging plug connector 17-3 can be connected to the charging battery provided on the back surface of the holding base main body 11 so that the secondary battery (lithium ion battery) built into the above-mentioned portable information terminal 40 is charged.

Next, description is given of a procedure of fixing the expansion battery-charging cover 16 to the lower end of the slide plate 131 in the portable information terminal holding base illustrated in the figures.

The expansion battery-charging cover 16 has a first protrusion 161 at its second side edge portion (left side edge portion), and a second protrusion 162 at its first side edge portion (right side edge portion). On the other hand, the holding base main body 11 has a first fitting hole at a lower part of its first side edge portion (right side edge portion), to which the first protrusion 161 is to be fitted. The extensible holding member 13 has a second fitting hole at a lower part of its second side edge portion (left side edge portion), to which the second protrusion 162 is to be fitted.

First, the extensible holding member 13 is extended to its maximum extension position. In this state, the first protrusion 161 of the expansion battery-charging cover 16 is fitted to the first fitting hole of the holding base main body 11. Subsequently, the second protrusion 162 of the expansion battery-charging cover 16 is fitted to the second fitting hole of the extensible holding member 13. Thus, the expansion battery-charging cover 16 is fixed to the lower end of the slide plate 131 at the position between the main mounting surface 11*a* and the extensible mounting surface 13*a*.

Note that, in the above-mentioned example, the first and second protrusions 161 and 162 are provided to the expansion battery-charging cover 16, and the first and second fitting holes are provided to the holding base main body 11 and the extensible holding member 13, respectively, but this invention is not limited to this fitting structure. For example, the first protrusion and the second fitting hole may be provided to the expansion battery-charging cover 16, and the first fitting hole and the second protrusion may be provided to the holding base main body 11 and the extensible holding member 13, respectively. Conversely, the first fitting hole and the second protrusion may be provided to the expansion battery-charging cover 16, and the first protrusion and the second fitting hole may be provided to the holding base main body 11 and the extensible holding member 13, respectively.

In the above-mentioned second embodiment of this invention, the following effects are attained.

The first effect is that the single portable information terminal holding base 10 can hold and charge the variety of portable information terminals 30, 31, and 40. The reason is because the plurality of fixing positions compatible with the battery-charging plug connectors 17-1, 17-2, and 17-3 of the respective portable information terminals 30, 31, and 40 are provided.

The second effect is that the battery-charging plug connectors 17-1, 17-2, and 17-3 can be fixed and removed easily. The reason is because the adsorption sheets 125 that are releasable repeatedly are arranged in the terminal cover 12 including the terminal housing section 121 and the terminal pressing plate 122.

The third effect is that the single portable information terminal holding base 10 can hold and charge the tablet terminal having the maximum length and width size that is twice or more as large as the smartphone having the minimum length and width size. The reason is because the portable information terminal holding base 10 includes the expansion battery-charging cover 16 to be fixed between the main mounting surface 11a and the extensible mounting surface 13a when the extensible holding member 13 provided to the holding base main body 11 is extended.

This invention has been described above with reference to the embodiments, but this invention is not limited to the above-mentioned embodiments. Various modifications understandable for a person having ordinary skill in the art may be made to the configurations and details of this invention within the scope of this invention.

This invention may be carried out in various other forms without departing from the gist or main feature of this invention. Therefore, the embodiments described above are only examples in all aspects, and should not be construed as limitations. The scope of this invention is defined by the claims, and is not restricted by the description herein. Further, the scope of this invention encompasses all modifications, various improvements, substitutions, and alterations that fall within the scope of equivalents of the claims.

This application is based on and claims the benefit of priority from Japanese Patent Application No. 2011-232523, filed on Oct. 24, 2011, the disclosure of which is incorporated herein by reference in its entirety.

REFERENCE SIGNS LIST 10 portable information terminal holding base
11 holding base main body
11a main mounting surface
12 terminal cover
121 terminal housing section
122 terminal pressing plate
123 latching claw
124 latching hole
125 adsorption sheet
126 fitting groove
127 insertion portion
128 taper
13 extensible holding member
13a extensible mounting surface
131 slide plate
132 leg
133 stopper
14 side plate
15 cushion
16 expansion battery-charging cover
161 first protrusion
162 second protrusion
163 expansion terminal housing section
164 expansion terminal pressing plate
165 latching claw
166 latching hole
167 adsorption sheet
168 fitting groove
169 insertion portion
170 taper
17-1, 17-2, 17-3 battery-charging plug connector
21 volume button
23 function button
25 incoming call lamp
27 Bluetooth module cooperation button
30 first portable information terminal
31 second portable information terminal
40 third portable information terminal
50 desk phone
60 call receiver section
62 handset
64 loudspeaker

The invention claimed is:

1. A portable information terminal holding base, comprising:
a holding base main body having a main mounting surface inclined with respect to a horizontal surface,
the holding base main body being configured to hold, on the main mounting surface, one of a plurality of types of portable information terminals including at least a first portable information terminal and a second portable information terminal that is different from the first portable information terminal in length and width size and position of a battery-charging slot provided at a lower end thereof; and
a battery-charging cover removably mounted to the holding base main body and comprising a terminal housing section configured to house therein one of the plurality of types of battery-charging plug connectors, which are formed compatible with the specifications of the battery-charging slots of the plurality of types of portable information terminals, respectively,
the battery-charging cover being configured to:
house, at a first fixing position, a battery-charging plug connector, which is formed compatible with specifications of a battery-charging slot of the first portable information terminal; and
fix, when the second portable information terminal is to be held on the holding base main body, at a second fixing position different from the first fixing position in accordance with the length and width size of the second portable information terminal and the position of the battery-charging slot of the second portable information terminal, a battery-charging plug connector, which is formed compatible with specifications of the battery-charging slot of the second portable information terminal,
wherein the first fixing position and the second fixing position are positions different from each other in a fore-and-aft direction and in a right-and-left direction, and the first fixing position and the second fixing position are positions at which the one of battery-charging plug connectors fixed to the battery-charging cover is insertable into the one of battery-charging slots of portable information terminals.

2. A portable information terminal holding base according to claim 1, wherein the battery-charging cover comprises:
a terminal pressing plate to be fixed to the terminal housing section having the one of battery-charging plug connectors housed therein,
the terminal pressing plate being configured to fix the one of battery-charging plug connectors at the first fixing position or the second fixing position.

3. A portable information terminal holding base according to claim 2, comprising an adsorption sheet having micropores formed therein,
the adsorption sheet being provided on an inner wall of each of the terminal housing section and the terminal pressing plate at the first fixing position or the second fixing position.

4. A portable information terminal holding base according to claim 1,
wherein the first portable information terminal has the smallest length and width size, and the plurality of types of portable information terminals at least include a third portable information terminal having the largest length and width size more than twice as large as the smallest length and width size, and wherein the portable information terminal holding base comprises:

an extensible holding member provided on a first side edge portion side of the holding base main body, the extensible holding member comprising a slide plate that is slidable inside the holding base main body, the extensible holding member having an extensible mounting surface that is movable in parallel to the main mounting surface, the extensible holding member comprising a stopper for supporting a lower end of the second portable information terminal when the extensible holding member is extended to a predetermined extension position; and an expansion battery-charging cover removably mounted to a lower end of the slide plate at a position between the main mounting surface and the extensible mounting surface, the expansion battery-charging cover being configured to fix, when the third portable information terminal is to be held on the holding base main body under a state in which the extensible holding member is extended to the predetermined extension position, at the third fixing position different from the first fixing position in accordance with the length and width size of the third portable information terminal and a position of a battery-charging slot of the third portable information terminal, a battery-charging plug connector, which is formed compatible with specifications of the battery-charging slot of the third portable information terminal.

5. A portable information terminal holding base according to claim 4, wherein the expansion battery-charging cover comprises:

an expansion terminal housing section configured to house therein the one of the plurality of types of battery-charging plug connectors, which are formed compatible with the specifications of the battery-charging slots of the plurality of types of portable information terminals, respectively; and an expansion terminal pressing plate to be fixed to the expansion terminal housing section having the one of battery-charging plug connectors housed therein, the expansion terminal pressing plate being configured to fix the one of battery-charging plug connectors at the third fixing position.

6. A portable information terminal holding base according to claim 5, comprising an adsorption sheet having micropores formed therein, the adsorption sheet being provided on an inner wall of each of the expansion terminal housing section and the expansion terminal pressing plate at the third fixing position.

7. A portable information terminal holding base according to claim 4, wherein the first fixing position, the second fixing position, and the third fixing position are positions different from each other in the fore-and-aft direction and in the right-and-left direction, and wherein the first fixing position, the second fixing position, and the third fixing position are positions at which the one of battery-charging plug connectors fixed to the battery-charging cover or the expansion battery-charging cover is insertable into the one of battery-charging slots of portable information terminals.

8. A desk phone, comprising:

the portable information terminal holding base according to claim 1; and a call receiver section provided on a second side edge portion side of the holding base main body.

\* \* \* \* \*